(12) United States Patent
LiVolsi et al.

(10) Patent No.: US 10,691,159 B2
(45) Date of Patent: Jun. 23, 2020

(54) LOCKING MECHANISM FOR A POTENTIOMETER

(71) Applicants: Anthony Louis LiVolsi, Oswego, NY (US); Scott Nelson Quinn, Wilmington, NC (US)

(72) Inventors: Anthony Louis LiVolsi, Oswego, NY (US); Scott Nelson Quinn, Wilmington, NC (US)

( * ) Notice: Subject to any disclaimer, the term of this patent is extended or adjusted under 35 U.S.C. 154(b) by 277 days.

(21) Appl. No.: 15/662,027

(22) Filed: Jul. 27, 2017

(65) Prior Publication Data
US 2017/0322584 A1 Nov. 9, 2017

Related U.S. Application Data

(63) Continuation-in-part of application No. 13/973,393, filed on Aug. 22, 2013, now Pat. No. 9,823,683.
(Continued)

(51) Int. Cl.
| | |
|---|---|
| *F01D 1/10* | (2006.01) |
| *G05G 1/12* | (2006.01) |
| *H01C 10/32* | (2006.01) |
| *F16D 1/10* | (2006.01) |
| *G05G 5/12* | (2006.01) |

(Continued)

(52) U.S. Cl.
CPC ............ *G05G 1/12* (2013.01); *F16D 1/10* (2013.01); *G05G 1/08* (2013.01); *G05G 5/005* (2013.01); *G05G 5/12* (2013.01); *H01C 10/32* (2013.01); *F16D 2001/103* (2013.01); *Y10T 74/2084* (2015.01)

(58) Field of Classification Search
CPC ............................ F16D 1/10; F16D 2001/103

USPC ........................................................ 74/553
See application file for complete search history.

(56) References Cited

U.S. PATENT DOCUMENTS 2,935,894 A * 5/1960 Coronado-Arce ....... G05G 5/24
74/503
3,619,594 A * 11/1971 Morez ...................... F16D 1/06
362/140

(Continued)

FOREIGN PATENT DOCUMENTS

DE 10131043 A1 * 1/2003

OTHER PUBLICATIONS

English Abstract of DE 10131043 A1, Martin et al., Jan. 9, 2003 (Year: 2003).*

*Primary Examiner* — Vinh Luong

(57) ABSTRACT

A potentiometer device has a tubular body, an actuation shaft, splines, spline-receiving cavities, a potentiometer, a tubular housing, first and second annular cavities and retention balls. The splines are externally positioned about the actuation shaft. The spline-receiving cavities are internally positioned around the tubular body. The potentiometer has a housing body and a wiper pin. The tubular body is connected to the housing body. The tubular housing and the wiper pin are positioned within the housing body. The tubular housing is connected to the housing body. The wiper pin is mechanically coupled to the actuation shaft. The actuation shaft is removably positioned within the tubular body and the housing body. The first annular cavity internally and radially traverses into the tubular housing. The second annular cavity externally and radially traverses into an output coupling end of the actuation shaft. The retention balls are engaged within the first annular cavity.

3 Claims, 6 Drawing Sheets

Related U.S. Application Data

(60) Provisional application No. 62/367,162, filed on Jul. 27, 2016.

(51) Int. Cl.
  *G05G 1/08* (2006.01)
  *G05G 5/00* (2006.01)

(56) References Cited

U.S. PATENT DOCUMENTS

| | | | | |
|---|---|---|---|---|
| 3,724,281 | A | * | 4/1973 | Dorchester ............. F16H 15/52 74/10.52 |
| 4,154,125 | A | * | 5/1979 | Frank ....................... G05G 1/10 200/336 |
| 4,201,096 | A | * | 5/1980 | Morrison ................. G05G 1/12 188/166 |
| 5,542,150 | A | * | 8/1996 | Tu ........................ A45C 13/123 16/113.1 |
| 5,803,239 | A | * | 9/1998 | Bray ........................ H01H 1/60 200/242 |
| 2004/0011271 | A1 | * | 1/2004 | Scott ...................... B63H 20/10 114/343 |
| 2005/0183537 | A1 | * | 8/2005 | Kojima ................... G05G 1/10 74/553 |
| 2013/0276572 | A1 | * | 10/2013 | Vogt ........................ G05G 1/02 74/553 |
| 2015/0053043 | A1 | * | 2/2015 | Livolsi .................... G05G 1/12 74/553 |
| 2018/0074542 | A1 | * | 3/2018 | Livolsi .................... G05G 1/12 |
| 2018/0335797 | A1 | * | 11/2018 | Livolsi .................. G05G 5/005 |
| 2019/0041893 | A1 | * | 2/2019 | Livolsi .................. G05G 1/082 |

\* cited by examiner

LOCKING MECHANISM FOR A POTENTIOMETER

The current application claims a priority to the U.S. Provisional Patent application Ser. No. 62/367,162 filed on Jul. 27, 2016.

FIELD OF THE INVENTION

The present invention relates generally to a novel locking mechanism for a potentiometer and other similar devices. In particular, the present invention utilizes splines interlocking with grooves to lock the potentiometer shaft at a particular angular displacement.

BACKGROUND OF THE INVENTION

A potentiometer is a variable resistor which utilizes a physical knob or other similar mechanical actuation devices in order to directly control the resistance in the circuit. The potentiometer utilizes a rotating knob in order to increase or decrease the overall resistance of the potentiometer in a circuit. In other words, the physical angular positioning of the knob directly determines the resistance produced by the potentiometer. One of the main issues with these potentiometers is when a user inadvertently hits or brushes the knob, thus accidentally turning the knob and resultantly changing the resistance in the connected circuit. This is especially problematic in the music industry as potentiometers are used to control a variety of functions inside an electric guitar such as control tone and volume, blend two pickups together, and attenuate one coil of humbucker.

The present invention solves this problem by integrating a locking mechanism in between the knob shaft and the body of the potentiometer. This ensures that, once set to a specific angular displacement, the potentiometer stays at said displacement. The present invention may be implemented in other fields as well. In general, the present invention is a locking mechanism for devices which utilize rotational motion of a shaft as a means of actuation/input. For example, the present invention may be utilized in push-push pots that toggle the switch simply by pushing on the shaft, no-load pots comprising a resistive element that is disconnected from one of the outer terminals, dual-gang pots, or the like may also be utilized.

DETAIL DESCRIPTIONS OF THE INVENTION

All illustrations of the drawings are for the purpose of describing selected versions of the present invention and are not intended to limit the scope of the present invention.

Figure 1:
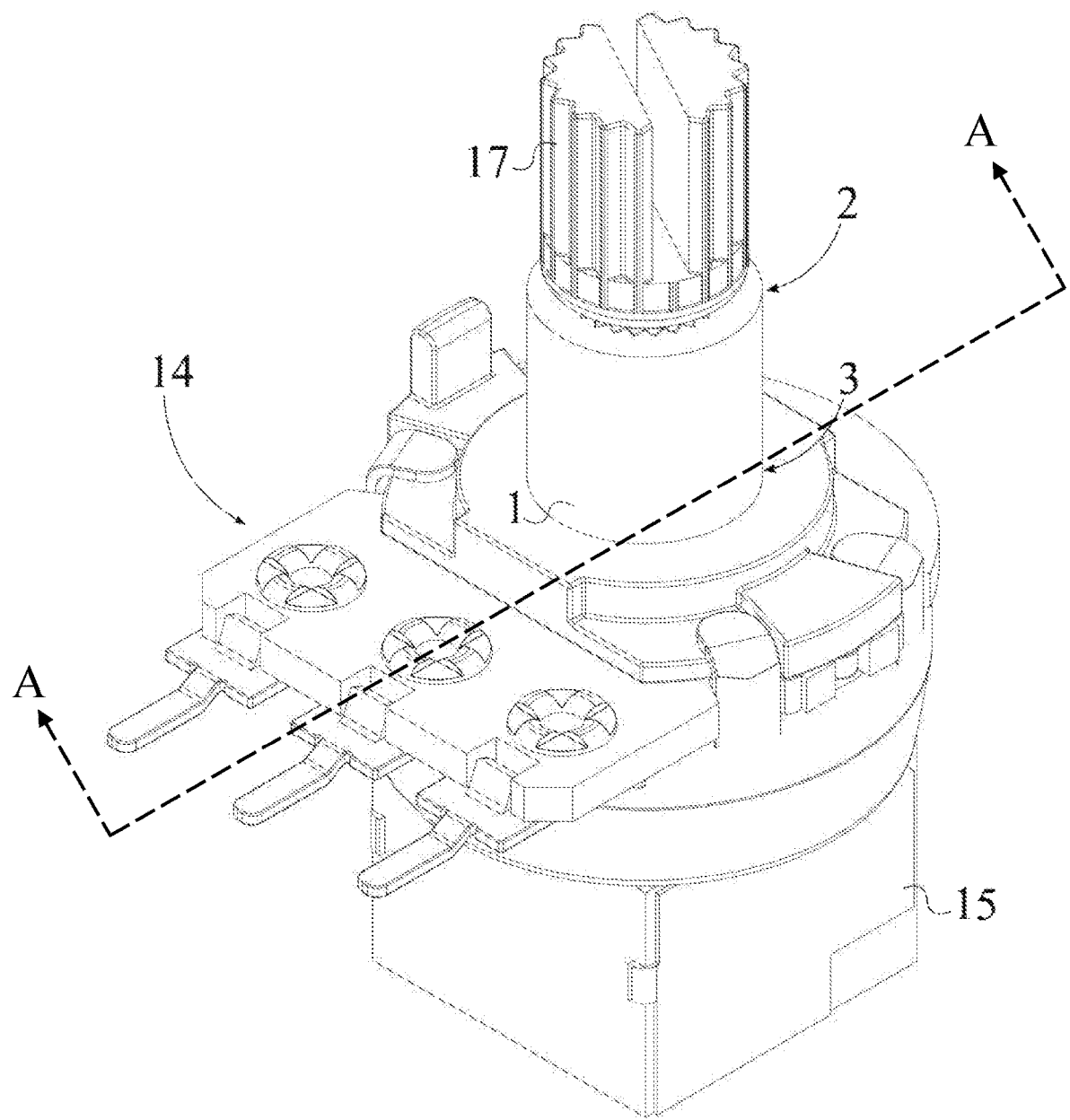
FIG. 1 is a perspective view of the present invention.

The present invention generally relates to locking mechanisms for electronic devices, in particular for potentiometers. More specifically, the present invention is a locking mechanism integrated into a control device that utilizes rotation motion of a shaft as means of actuation/input. Such devices include, but are not limited to, traditional potentiometers, push-push pots that toggle the switch simply by pushing on the shaft, no-load pots comprising a resistive element that is disconnected from one of the outer terminals, dual-gang pots, volume knobs in stereos, and other similar applications which require an angular displacement as a means of a control input. For simplicity purposes, referring to FIG. 1, the present invention is disclosed and described in reference to being integrated into a potentiometer 14, wherein the present invention allows a user to lock the potentiometer 14 at any resistance level. This ensures that the resistance of the potentiometer 14 does not change when accidentally brushed or hit by the user.

Figure 3:
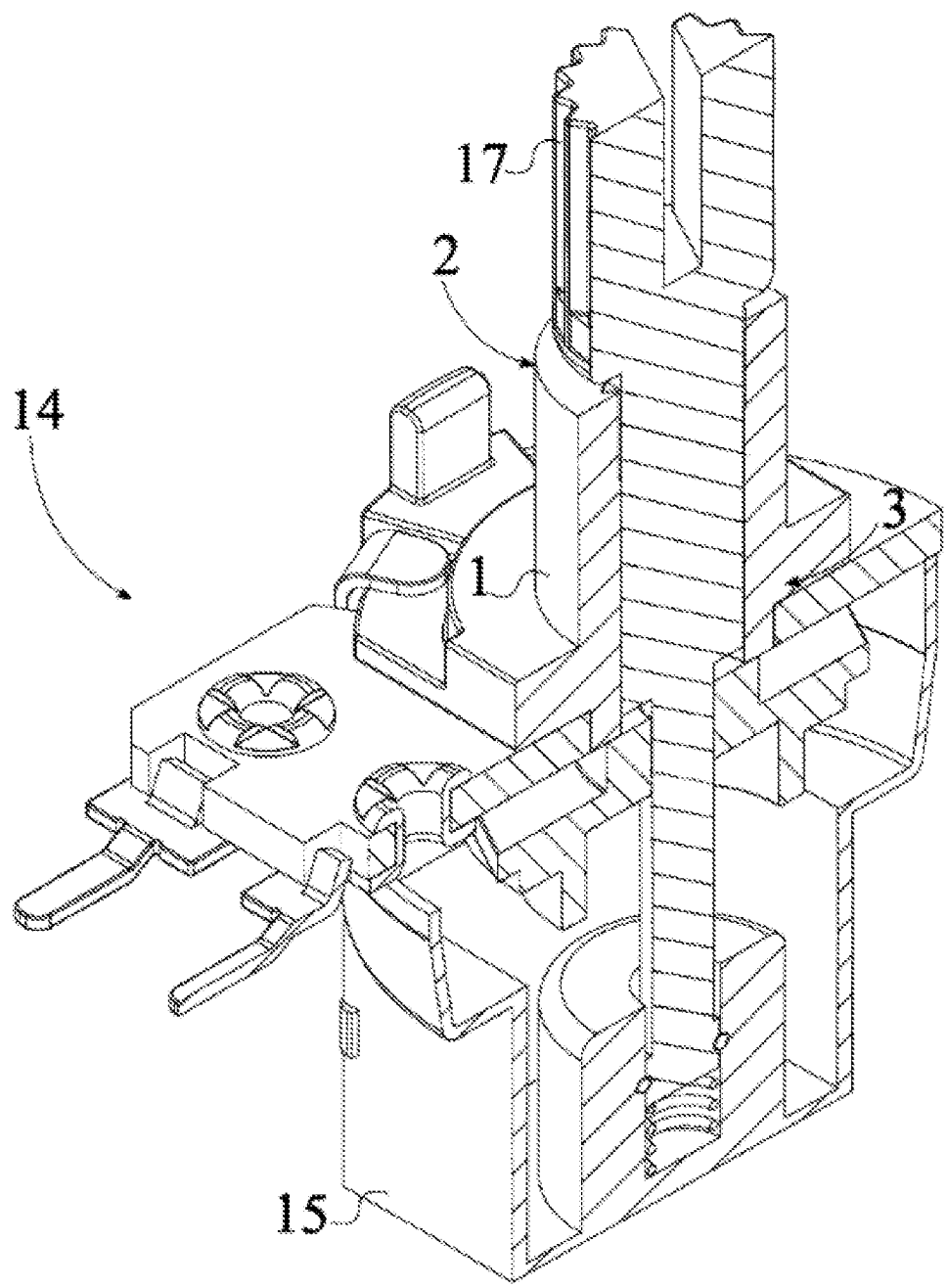
FIG. 3 is a sectional view of the present invention along line 3, 4-3, 4 of FIG. 1, wherein the present invention is positioned into a locked configuration.

The potentiometer 14 is a three-terminal resistor that divides an input current into an output current and an excess current discharged into the ground. Referring to FIG. 3, the potentiometer 14 comprises a housing body 15, a wiper pin 16, a resistive element, and an at least two electrical terminals. The present invention comprises a tubular body 1, a shaft-receiving hole 13, an actuation shaft 5, a plurality of splines 8, a plurality of spline-receiving cavities 10, and a push-lock mechanism 12. The present invention is integrated into the potentiometer 14 in order to allow a user to lock a specific resistance setting of the potentiometer 14.

Figure 5:
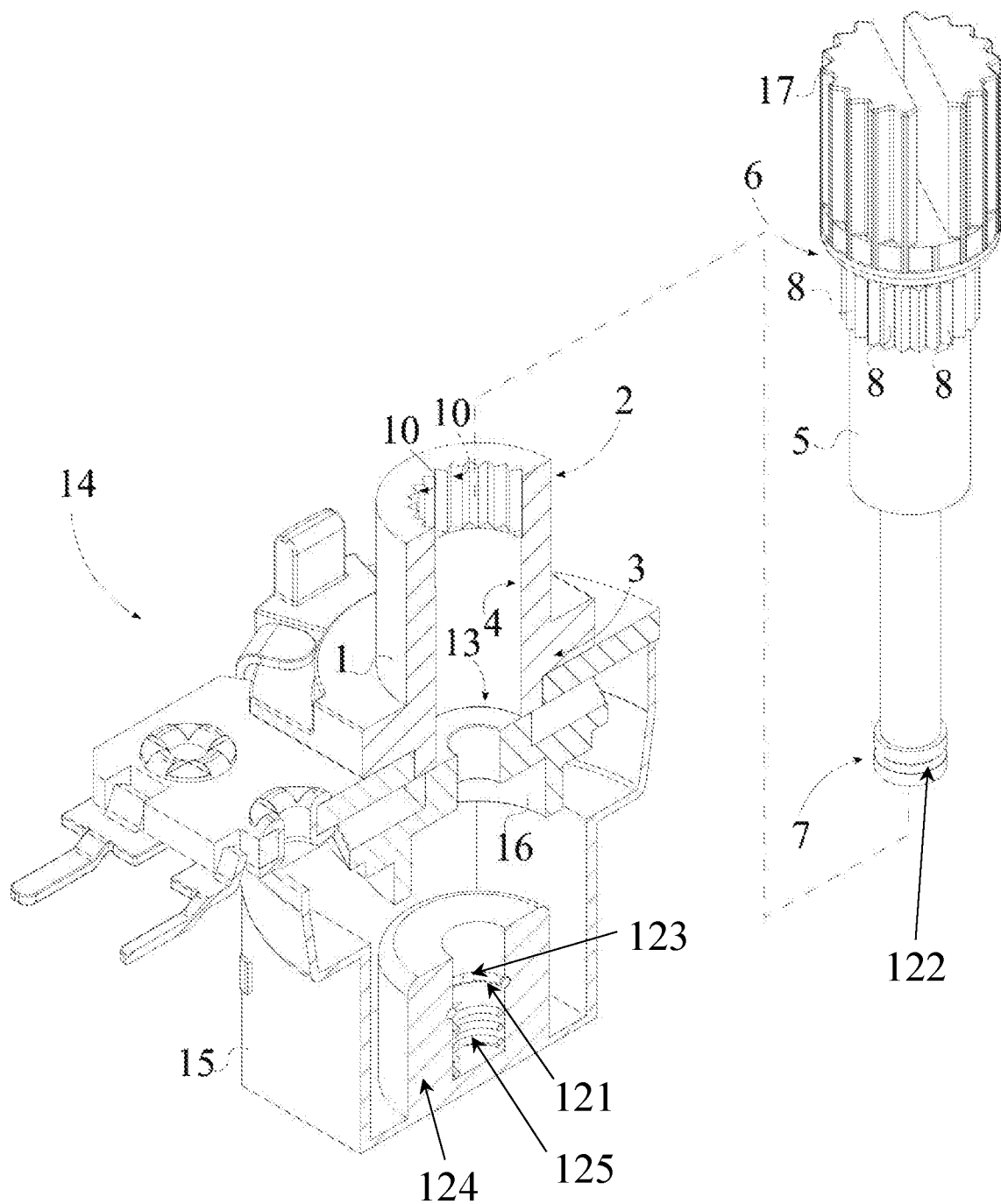
FIG. 5 is a sectional view of the present invention along line 5, 6-5, 6 of FIG. 2.

Referring to FIG. 5, the housing body 15 encompasses and protects the wiper pin 16, the resistive element, the push-lock mechanism 12, and other necessary electronic components of the potentiometer 14. The resistive element is a circular strip of resistor material partially spanning the circumference of the housing body 15. The electrical terminals are engaged to the distal ends of the resistive element whereby the current enters into the potentiometer 14 and excess electricity is grounded. The wiper pin 16 is a rotating element in contact with the resistive element and in electrical communication with an inner terminal. The wiper pin 16 is able to translate along the resistive element, thus adjusting the electrical contact point on resistance element. This in turn increases or decreases the overall resistance of the potentiometer 14. In general, the angular position of the wiper pin 16 dictates the overall current flowing out of the potentiometer 14. The wiper pin 16 is positioned within the housing body 15 and controller by the actuation shaft 5. The shaft-receiving hole 13 and the tubular body 1 couple the actuation shaft 5 to the housing body 15 and thus the wiper pin 16. The shaft-receiving hole 13 normally traverses into the housing body 15. The tubular body 1 is positioned concentric with the shaft-receiving hole 13 and is sized complimentary to the dimensions of the shaft-receiving hole 13. Additionally, the tubular body 1 is connected adjacent and normal to the housing body 15. More specifically, a second end 3 of the tubular body 1 is connected adjacent to the housing body 15.

The actuation shaft 5 directly controls the angular displacement of the wiper pin 16, which in turn controls the resistance of the potentiometer 14. The actuation shaft 5 is shaped complimentary to the tubular body 1 and the shaft-receiving hole 13 in order to allow the actuation shaft 5 to slide relative to the tubular body 1 and the housing body 15. In particular, the actuation shaft 5 is concentrically and slidably positioned within the tubular body 1. The actuation shaft 5 comprises a grasping end 6 and an output coupling end 7. The grasping end 6 of the actuation shaft 5 is positioned adjacent to a first end 2 of the tubular body 1. Resultantly, the grasping end 6 extends outside of the tubular body 1 and the housing body 15, thus providing the user with a means for grasping and rotating the actuation shaft 5. The output coupling end 7 is positioned within the housing body 15 and is mechanically coupled to the push-lock mechanism 12. Additionally, a length of the actuation shaft 5 is greater than a length of the tubular body 1 such that the actuation shaft 5 extends past the first end 2 of the tubular body 1 and a second end 3 of the tubular body 1. The wiper pin 16 is mechanically coupled to the actuation shaft 5 such that the angular displacement of the actuation shaft 5 rotates the wiper pin 16 within the housing body 15. In one embodiment, the wiper pin 16 is slidably attached to the actuation shaft 5 such that the rotation motion of the actuation shaft 5 is transferred regardless of the vertical positioning of the actuation shaft 5.

The plurality of splines 8 and the plurality of spline-receiving cavities 10 interlock in a male-female mating fashion to lock and prevent the actuation shaft 5 from rotating relative to the tubular body 1. This also locks the wiper pin 16 and thus the resistance of the potentiometer 14. Referring to FIG. 5, each of the plurality of splines 8 is an elongated tooth/ridge feature that is aligned parallel to the actuation shaft 5. More specifically, the plurality of splines 8 is radially positioned about the actuation shaft 5 with each of the plurality of splines 8 being laterally connected to the actuation shaft 5. Additionally, the plurality of splines 8 is positioned adjacent to the grasping end 6 of the actuation shaft 5.

Figure 2:
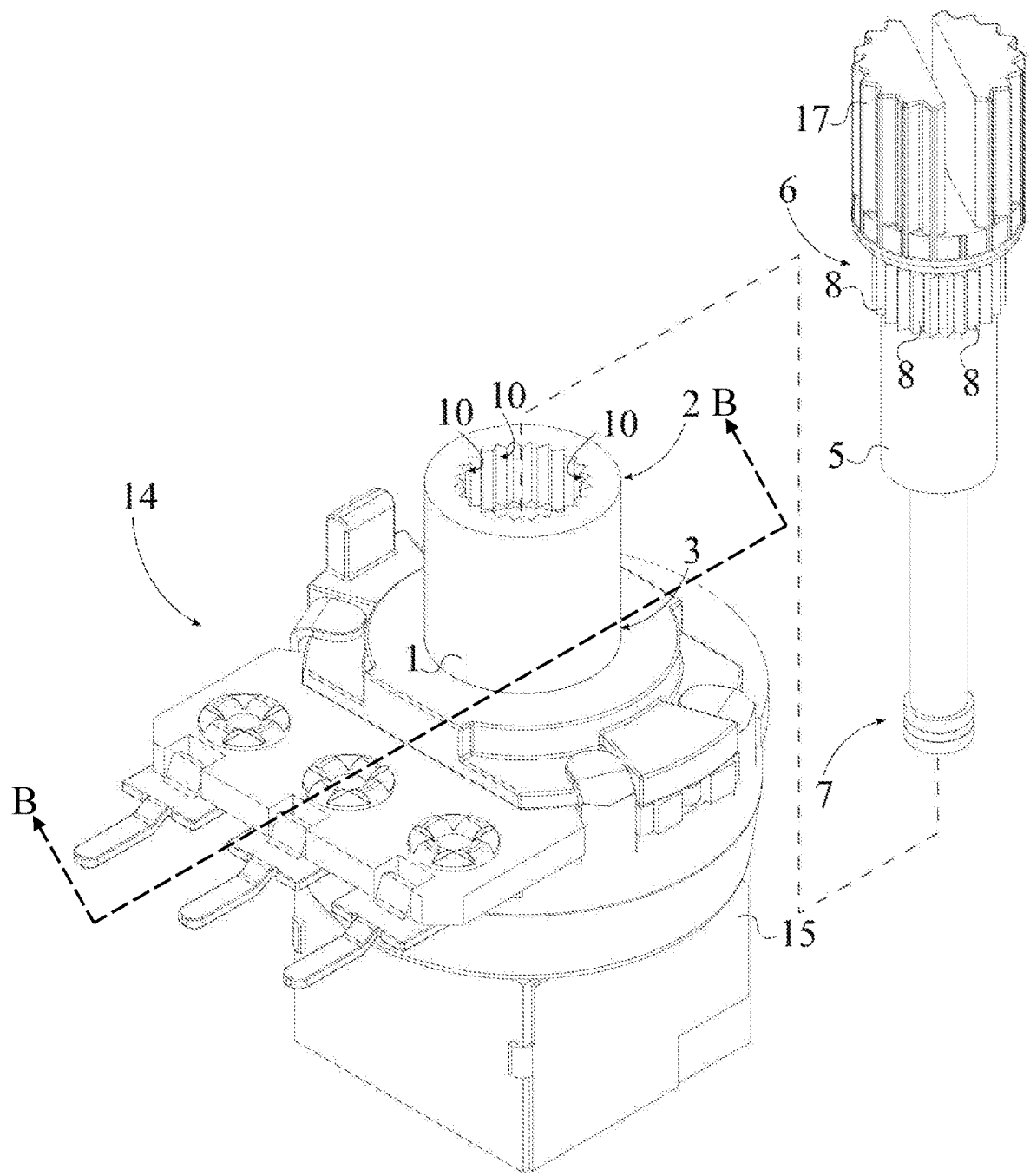
FIG. 2 is an exploded perspective view of the present invention.
Figure 4:
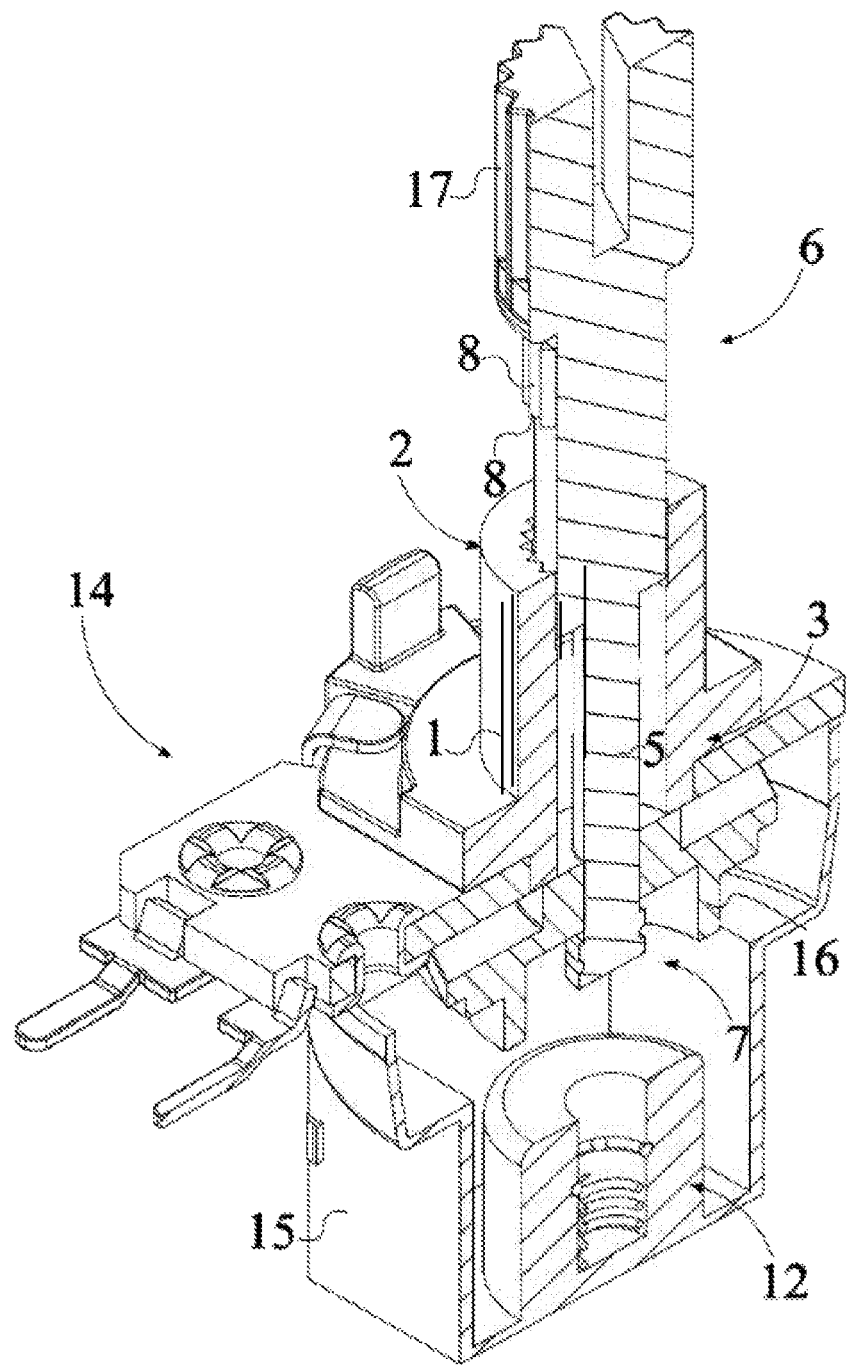
FIG. 4 is another sectional view of the present invention along line 3, 4-3, 4 of FIG. 1, wherein the present invention is positioned into an open configuration.

Referring to FIG. 2 and FIG. 5, each of the plurality of spline-receiving cavities 10 is an empty space within the tubular body 1 that is sized and shaped to receive a spline from the plurality of splines 8. More specifically, the plurality of spline-receiving cavities 10 is radially positioned around the tubular body 1, complimentary to the configuration of the plurality of splines 8 on the actuation shaft 5. Each of the plurality of spline-receiving cavities 10 laterally traversing into the tubular body 1 from an inner surface 4 of the tubular body 1. Additionally, each of the plurality of spline-receiving cavities 10 extends from the first end 2 of the tubular body 1 towards the second end 3 of the tubular body 1. This aligns each of the plurality of spline-receiving cavities 10 parallel to the tubular body 1 and positions each of the plurality of spline-receiving cavities 10 adjacent to the first end 2 of the tubular body 1 as seen in FIG. 4 and FIG. 5.

In the preferred embodiment of the present invention, the number within the plurality of splines 8 is equal to the number within the plurality of spline-receiving cavities 10. Alternatively, in another embodiment of the present invention, the number within the plurality of splines 8 is less than the number within the plurality of spline-receiving cavities 10. These configurations ensure that the plurality of splines 8 adequately mate with the plurality of spline-receiving cavities 10. In general, the plurality of splines 8 and the plurality of spline-receiving cavities 10 prevent the actuation shaft 5 from rotating relative to the tubular body 1. The plurality of splines 8 and the plurality of spline-receiving cavities 10 do allow for relative axial movement in between the actuation shaft 5 and the tubular body 1.

The push-lock mechanism 12 is an obstruction-based locking mechanism which is integrated in between the tubular body 1 and the actuation shaft 5. The push-lock mechanism 12 controls the aforementioned axial movement. Referring to FIG. 3, the push-lock mechanism 12 is mounted offset to the second end 3 of the tubular body 1, opposite the first end 2 of the tubular body 1. In particular, the push-lock mechanism 12 is positioned opposite the shaft-receiving hole 13, across the housing body 15, and is adjacently connected to the housing body 15. This aligns the push-lock mechanism 12 with the actuation shaft 5. The output coupling end 7 of the actuation shaft 5 is bistably coupled to the tubular body 1 by the push-lock mechanism 12. When the output coupling end 7 is engaged with the push-lock mechanism 12, the actuation shaft 5 is not able to axially move relative to the tubular body 1. Alternatively, when the output coupling end 7 is disengaged from the push-lock mechanism 12, the actuation shaft 5 is free to slide along the tubular body 1. In one embodiment of the present invention, the push-lock mechanism 12 comprises a first annular cavity 121, a second annular cavity 122, a plurality of retention balls 123, a tubular housing 124, and a spring 125. The tubular housing 124 is positioned concentric with the actuation shaft 5 and is adjacently connected to the housing body 15. The first annular cavity 121 traverses into the tubular housing 124 from an internal lumen. The second annular cavity 122 traverses into the actuation shaft 5, adjacent to the output coupling end 7. The plurality of retention balls 123 are positioned within the first annular cavity 121. The spring 125 is concentrically positioned within the tubular housing 124 in order to release the push-lock mechanism 12. The output coupling end 7 is positioned within the tubular housing 124 with the plurality of retention balls 123 being engaged with both the first annular cavity 121 and the second cavity. This is the locked position of the push-lock mechanism 12. To release the actuation shaft 5, the user simply pulls or pushes onto the actuation shaft 5, which releases the plurality of retentions balls. In alternative embodiments, alternative designs, mechanisms, and devices may be used for the push-lock mechanism 12.

The present invention may be positioned into two configurations, a locked configuration and an open configuration. When the actuation shaft 5, the tubular body 1, the plurality splines, and the plurality of spline-receiving cavities 10 are configured into the open configuration, the actuation shaft 5 is free to rotate relative to the tubular body 1, thus allowing the user to adjust angular displacement of the wiper pin 16 and thus the resistance of the potentiometer 14. More specifically, in the open configuration, the grasping end 6 of the actuation shaft 5 is positioned offset to the first end 2 of the tubular body 1 in order to axially offset the plurality of splines 8 from the plurality of spline-receiving cavities 10 as seen in FIG. 4. This setting rotatably releases the actuation shaft 5 from the tubular body 1. Additionally, in the open configuration, the output coupling end 7 is disengaged from the push-lock mechanism 12. This setting allows the actuation shaft 5 to slide within the tubular body 1 for when the user would like to position the present invention into the locked configuration.

When the actuation shaft 5, the tubular body 1, the plurality splines, and the plurality of spline-receiving cavities 10 are configured into the locked configuration, the actuation shaft 5 is fixed within the tubular body 1 through the push-lock mechanism 12 and is not able to rotate relative to the tubular body 1. In particular, in the locked configuration, the grasping end 6 is positioned adjacent to the first end 2 of the tubular body 1 such that each of the plurality of splines 8 is positioned within a corresponding cavity from the plurality of spline-receiving cavities 10 as seen in FIG. 3. This setting prevents the actuation shaft 5 from rotating relative to the tubular body 1. To secure the actuation shaft 5 in this position, the push-lock mechanism 12 is used. In particular, when the grasping end 6 is positioned adjacent to the first end 2 of the tubular body 1, the output coupling end 7 presses against and engages the push-lock mechanism 12. This is the main purpose of the present invention. In the locked configuration, the internal settings of the potentiometer 14, or the control device that the present invention is integrated into, are locked and cannot be adjusted unless the user specifically changes the configuration of the present invention. This ensures that the internal settings do not change due to accidental bumping or brushing of the actuation shaft 5. In order to change the configuration of the present invention, the user simply pushes the actuation shaft 5 towards the push-lock mechanism 12.

To provide the user with a grasping element, the present invention further comprises a knob 17. The knob 17 is a cylindrical extrusion with a plurality of friction elements distributed about the outer surface. Although, alternative shapes and sizes may be used for the design of the knob 17. The knob 17 is positioned concentric and adjacent to the grasping end 6 of the actuation shaft 5. Additionally, the knob 17 is adjacently connected to the actuation shaft 5. Through the knob 17, the user may rotate the actuation shaft 5 to a higher degree of precision.

Figure 6:
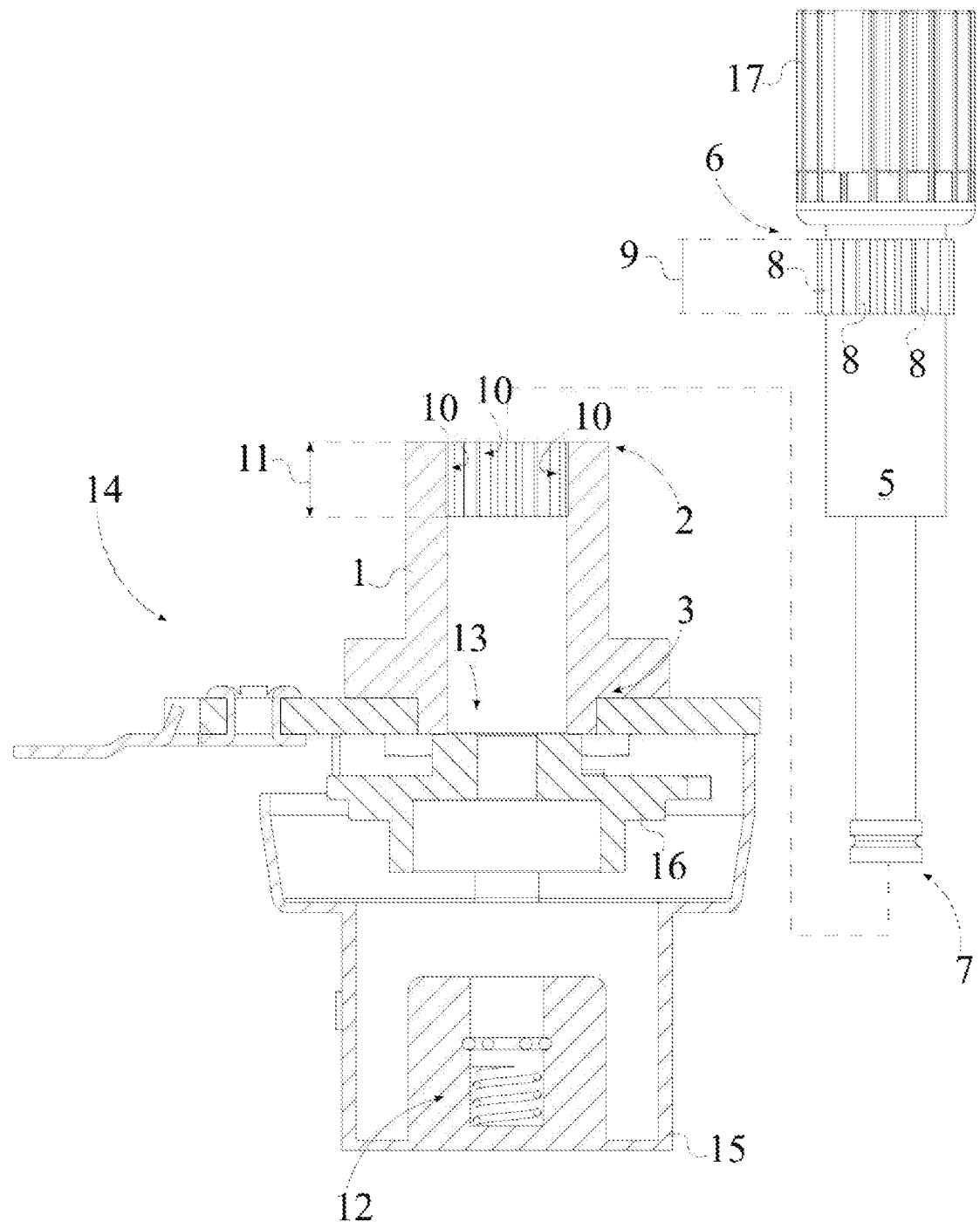
FIG. 6 is another sectional view of the present invention along line 5, 6-5, 6 of FIG. 2.

Referring to FIG. 6, in the preferred embodiment of the present invention, a length 9 of the each of the plurality of splines 8 is equal to a length 11 of each of the plurality of spline-receiving cavities 10. Additionally, a cross-section of each of the plurality of splines 8 and a cross-section of each of the plurality of spline-receiving cavities 10 is a triangle. These designs ensure a flush interlock between the plurality of splines 8 and the plurality of spline-receiving cavities 10. Although, alternative sizing and shapes may be used for each of the plurality of splines 8 and each of the plurality of spline-receiving cavities 10 in alternative embodiments.

Although the invention has been explained in relation to its preferred embodiment, it is to be understood that many other possible modifications and variations can be made without departing from the spirit and scope of the invention as hereinafter claimed.

What is claimed is:

1. A potentiometer device comprising:
a tubular body;
an actuation shaft;
a plurality of splines;
a plurality of spline-receiving cavities;
a potentiometer;
a shaft-receiving hole;
the plurality of splines being externally and radially positioned about the actuation shaft;
each of the plurality of splines being laterally connected to the actuation shaft;
the plurality of splines being positioned adjacent to a grasping end of the actuation shaft;
the plurality of spline-receiving cavities being internally and radially positioned around the tubular body;
each of the plurality of spline-receiving cavities laterally traversing into the tubular body from an inner surface of the tubular body;
each of the plurality of spline-receiving cavities extending from a first end of the tubular body towards a second end of the tubular body;
the potentiometer comprising a housing body and a wiper pin;
the shaft-receiving hole normally traversing into the housing body;
the tubular body being positioned concentric with the shaft-receiving hole;
the tubular body being connected adjacent and normal to the housing body;
a tubular housing;
the tubular housing being positioned concentric with the shaft-receiving hole;
the tubular housing and the wiper pin being positioned within the housing body;
the tubular housing being positioned opposite the shaft-receiving hole, across the housing body;
the tubular housing being mounted offset to the second end opposite the first end;
the tubular housing being connected adjacent and normal to the housing body;
the wiper pin being mechanically coupled to the actuation shaft;
the actuation shaft being removably positioned within the tubular body, the shaft-receiving hole and the housing body;
the actuation shaft being concentrically and slidably positioned within the tubular body, the shaft-receiving hole and the housing body;
a first annular cavity;
the first annular cavity internally and radially traversing into the tubular housing;
a second annular cavity;
the second annular cavity externally and radially traversing into an output coupling end of the actuation shaft;
a plurality of retention balls;
the plurality of retention balls being engaged within the first annular cavity;
the plurality of retention balls being removably engaged within the second annular cavity;
the grasping end being positioned adjacent to the first end, each of the plurality of splines being positioned within a corresponding cavity among the plurality of spline-receiving cavities, the output coupling end being positioned within the tubular housing, the output coupling end being positioned adjacent to the second end, and the plurality of retention balls being engaged within the second annular cavity, such that the actuation shaft, the tubular body, the shaft-receiving hole, the housing body, the plurality of splines, the plurality of spline-receiving cavities, the tubular housing, the plurality of retention balls, the first annular cavity and the second annular cavity are configured into a locked configuration; and
the grasping end being positioned offset to the first end, the plurality of splines being positioned axially offset from the plurality of spline-receiving cavities, and the plurality of retention balls being disengaged from the second annular cavity, such that the actuation shaft, the tubular body, the shaft-receiving hole, the housing body, the plurality of splines, the plurality of spline-receiving cavities, the tubular housing, the plurality of retention balls, the first annular cavity and the second annular cavity are configured into an open configuration.

2. The potentiometer device as claimed in claim 1 comprising:
a knob;
the knob being positioned concentric and adjacent to the grasping end of the actuation shaft; and
the knob being adjacently connected to the actuation shaft.

3. The potentiometer device as claimed in claim 1, wherein a length of each of the plurality of splines is equal to a length of each of the plurality of spline-receiving cavities.

\* \* \* \* \*